United States Patent [19]

Kosaka

[11] Patent Number: 5,600,748
[45] Date of Patent: Feb. 4, 1997

[54] OPTICAL CROSS-COUPLING APPARATUS

[75] Inventor: Hideo Kosaka, Tokyo, Japan

[73] Assignee: NEC Corporation, Japan

[21] Appl. No.: 592,264

[22] Filed: Jan. 26, 1996

[30] Foreign Application Priority Data

Jan. 31, 1995 [JP] Japan .................................. 7-032919

[51] Int. Cl.6 ...................................................... G02B 6/38
[52] U.S. Cl. ................................ 385/59; 385/71; 385/89; 385/53; 385/139
[58] Field of Search ................................ 385/59, 71, 89, 385/17, 52, 56, 58, 64, 53, 82, 139

[56] References Cited

U.S. PATENT DOCUMENTS

5,216,732   6/1993   Knoh ........................................ 385/59

Primary Examiner—Phan T. H. Palmer
Attorney, Agent, or Firm—Hayes, Soloway, Hennessey, Grossman & Hage, P.C.

[57] ABSTRACT

An optical cross-coupling apparatus including a plurality of first connector groups in each of which a plurality of optical fibers are aligned in a one-dimensional array, a plurality of (corresponding in number to said first connector groups) second connector groups in each of which a plurality of optical fibers are aligned in a one-dimensional array, and a socket in which said first and second connector groups are aligned to oppose each other crosswise and mounted such that distal end faces of respective connectors of said two connector groups oppose and are in contact with each other on one plane.

3 Claims, 8 Drawing Sheets

OPTICAL CROSS-COUPLING APPARATUS

BACKGROUND OF THE INVENTION

1. Field of the Invention

The present invention relates to an optical cross-coupling apparatus for performing parallel optical connection in highly parallel optical information transmission or optical information processing that utilizes optical fibers.

2. Description of the Prior Art

Figure 1A:
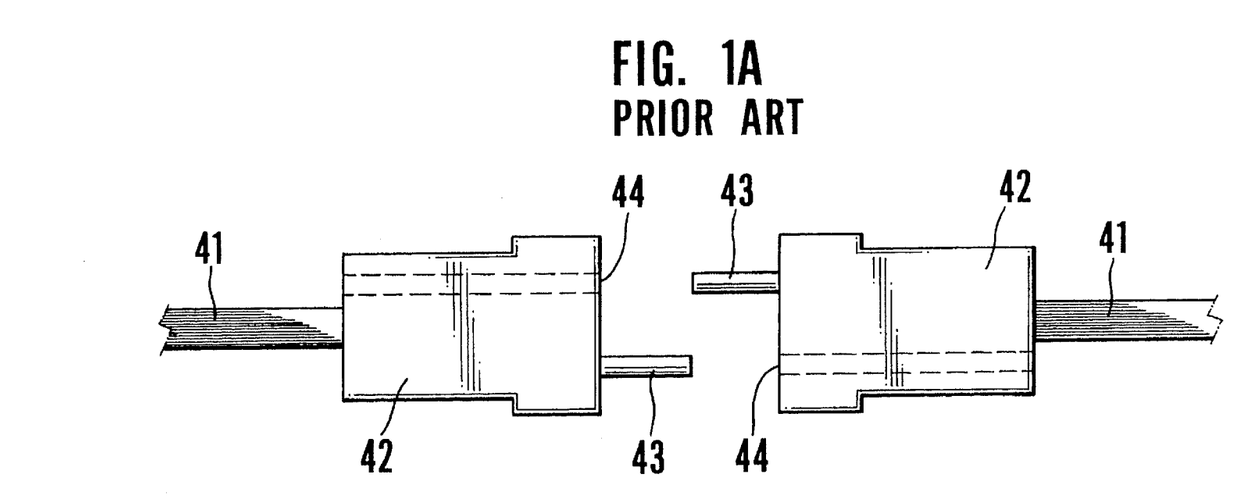
FIGS. 1A and 1B are plan and front views, respectively, showing an example of conventional one-dimensional fiber array connectors.
Figure 1B:
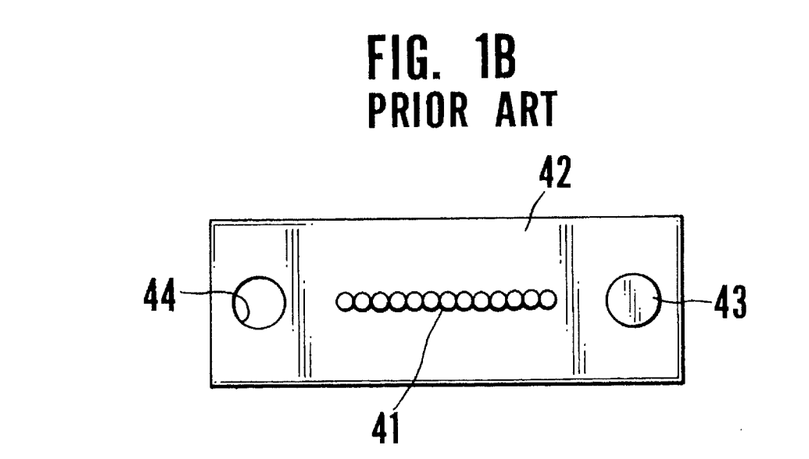

Conventionally, in highly parallel optical information transmission or optical information processing that utilizes optical fibers, connectors for connecting a large number of optical fibers at once are required. For example, FIGS. 1A and 1B are plan and front views, respectively, of an example of such connectors that are formed as one-dimensional fiber array connectors. In each of these one-dimensional fiber array connectors, multi-type tape-like optical fibers 41 are aligned one-dimensionally with a multi-type ferrule 42 made of a resin or the like. A guide pin 43 is provided to project from one portion of one side of each connector, and a guide pin hole 44 is formed in the other portion of one side of each connector. When the guide pins of the two connectors are fitted in the guide pin holes of the opposing connectors, the end faces of the multi-type tape-like optical fibers of one connector are brought into contact with those of the opposite connector, thereby allowing transmission of light signals between the two connectors.

Figure 2:
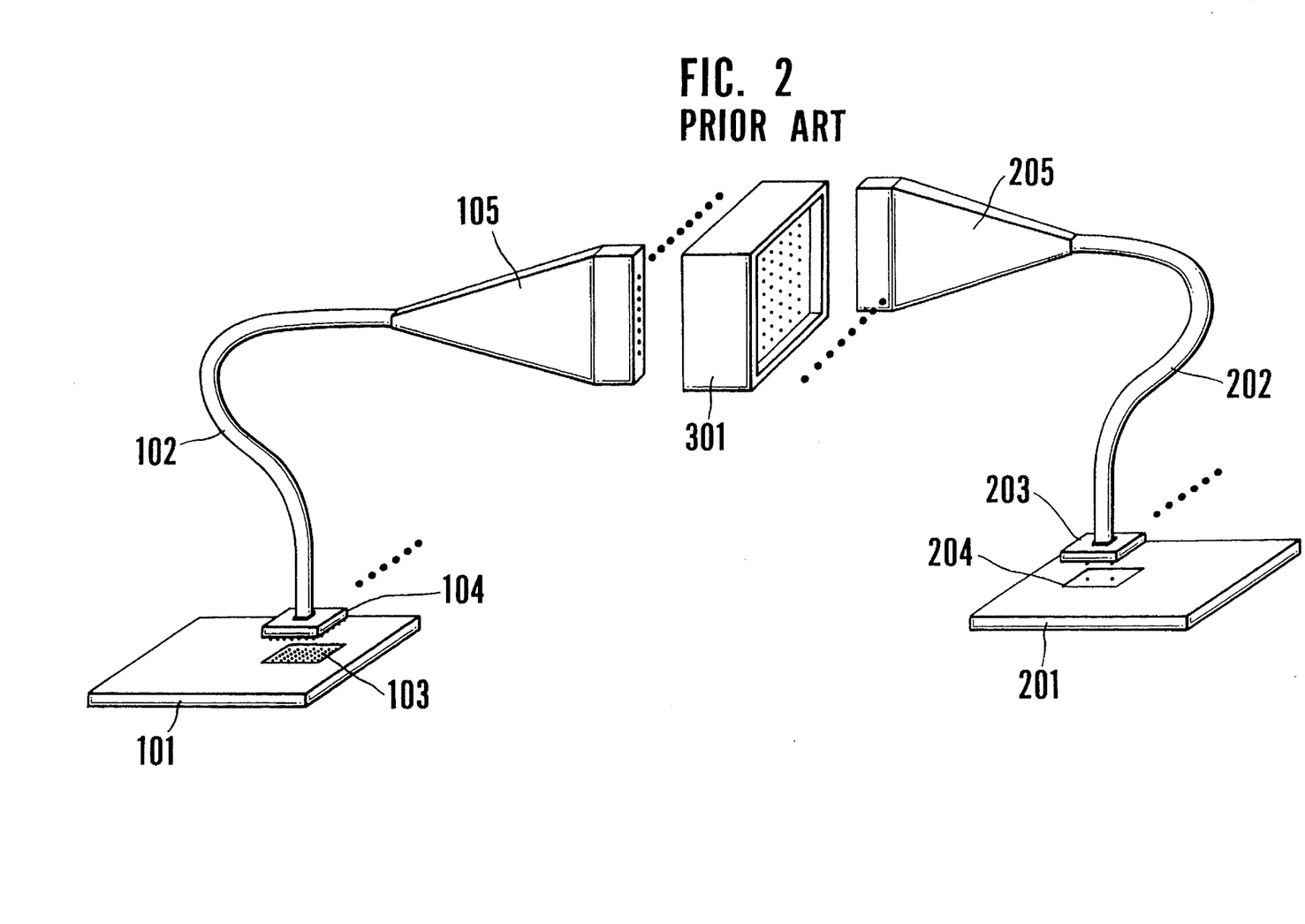
FIG. 2 shows the concept of a board-to-board signal transmission apparatus employing a conventional optical cross-coupling portion.

In these conventional one-dimensional fiber array connectors, merely the opposing one-dimensional optical fibers of the two connectors are connected to each other, and the plurality of one-dimensional fiber arrays cannot be connected crosswise. For example, apparatuses as shown in FIG. 2 are available. In one apparatus, one end portion of an optical fiber bundle 102 is connected to a transmission board 101 through a selection circuit 103 and a surface light-emitting element array 104, and a one-dimensional fiber array connector 105 is connected to the other end portion of the optical fiber bundle 102. In the other apparatus, one end portion of an optical fiber bundle 202 is connected to a reception board 201 through a light-receiving element array 203 and an amplifier 204, and the other end portion of the optical fiber bundle 202 is connected to a one-dimensional fiber array connector 205. A plurality of such apparatuses are provided to each of the transmission and reception sides, thus constituting a space-division optical switch that requires crosswise transmission of optical signals between the respective transmission boards 101 and the respective reception boards 201.

In this case, the plurality of one-dimensional fiber array connectors 105 on the transmission side are connected to one surface of a cross-coupling portion 301, and similarly the plurality of one-dimensional fiber array connectors 205 are connected to the other surface of the cross-coupling portion 301. A large number of optical fibers are arranged crosswise and formed in the cross-coupling portion 301 in order to set the optical fibers 102 and 202 connected to the two surfaces of the cross-coupling portion 301 in a crossing state. Thus, the large number of optical fibers of the respective connectors 105 and 205 are cross-connected to each other through these internal crossing optical fibers.

In this manner, conventionally, when connecting a plurality of one-dimensional fiber array connectors with another plurality of one-dimensional fiber array connectors crosswise, a cross-coupling portion in which a large number of optical fibers are arranged crosswise and which has a complicated arrangement is required. However, such a cross-coupling portion is very difficult to manufacture and is difficult to manufacture on a mass-production basis. A different exclusive cross-coupling portion must be manufactured for a one-dimensional fiber array connector having a different standard, leading to different design and manufacture. As a result, a cross-coupling portion cannot be supplied at a low cost.

SUMMARY OF THE INVENTION

The present invention has been made in view of the above situation, and has as its object to provide an optical cross-coupling apparatus that enables, with a simple structure that can be manufactured on a mass-production basis, optical cross connection of two sets of connector groups, each consisting of a plurality of optical fiber array connectors in which a plurality of optical fibers are aligned in a one-dimensional array.

In order to achieve the above object, according to the basic aspect of the present invention, there is provided an optical cross-coupling apparatus comprising a first connector group consisting of a plurality of connectors in each of which a plurality of optical fibers are aligned in a one-dimensional array, a second connector group consisting of a plurality of (corresponding in number to the first connector group) connectors in each of which a plurality of optical fibers are aligned in a one-dimensional array, and a socket in which the first and second connector groups are aligned to oppose each other crosswise and mounted such that distal end faces of respective connectors of the two connector groups oppose and are in contact with each other on one plane.

In the above basic aspect, guide pins are provided at two end portions, in a longitudinal direction, of opposing surfaces of the connectors, the socket is formed into a rectangular frame, and a plurality of guide pin holes in which the guide pins are to be inserted are formed in the frame portion in one array in both vertical and horizontal directions.

In the above basic aspect, the socket is formed by assembling four prismic components having the same shape in parallel crosses.

Each of the four prismic components constituting the socket has through holes larger in number than optical fibers to be mounted therein by two, and the four prismic components are assembled in parallel crosses with set members inserted in two through holes at two ends thereof. Each of the through holes excluding the two through holes at the two ends of each prismic component has one end side with an inner diameter equal to the outer diameter of the guide pins and the other end side with an inner diameter equal to the outer diameter of the optical fibers.

When the guide pins are set in the two through holes at the two ends of each prismic component and the optical fibers are fixed in the remaining through holes of each prismic component, the prismic components are employed as the first and second connectors.

As described above, in the optical cross-coupling apparatus of the present invention, first and second connector groups each consisting of a plurality of connectors each obtained by aligning a plurality of optical fibers in a one-dimensional array are mounted on a socket to oppose each other crosswise such that the distal end faces of the respective connectors oppose and are in contact with each other on one plane. Hence, optical connection of a plurality of one-dimensional optical fiber array connectors that oppose each other crosswise can be achieved comparatively easily with a structure that can be manufactured on a mass-production basis. As a result, a space-division optical switch required in board-to-board signal transmission can be realized easily.

In particular, guide pins are provided at two sides of the connectors, the socket is formed into a rectangular frame, and a plurality of guide pin holes in which the guide pins are to be inserted are formed in the frame portion in one array in both vertical and horizontal directions. Hence, the socket can be made to have a very simple arrangement as compared to the conventional cross-coupling portion having a complicated internal structure, thereby enhancing the effect described above.

Since the socket is formed by assembling four prismic components in parallel crosses, the connecting surfaces of the first and second connector groups can be made flat to be located on the same plane at high precision. Furthermore, the connectors and the socket can be made from common components having the same shapes, thereby decreasing the number of components.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF PREFERRED EMBODIMENTS

Several preferred embodiments of the present invention will be described with reference to the accompanying drawings.

Figure 3:
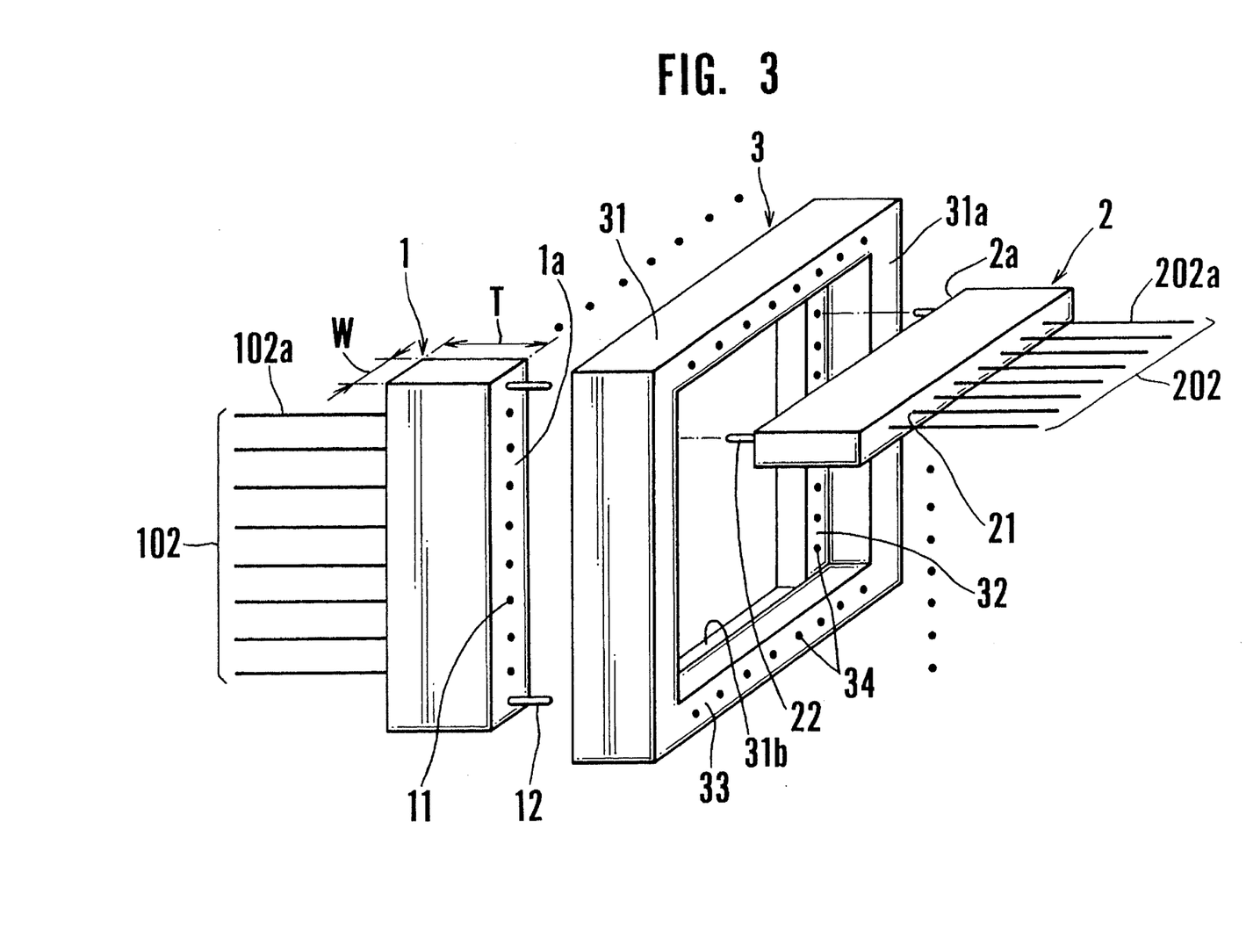
FIG. 3 is a partially exploded perspective view of the first embodiment of the present invention.
Figure 4:
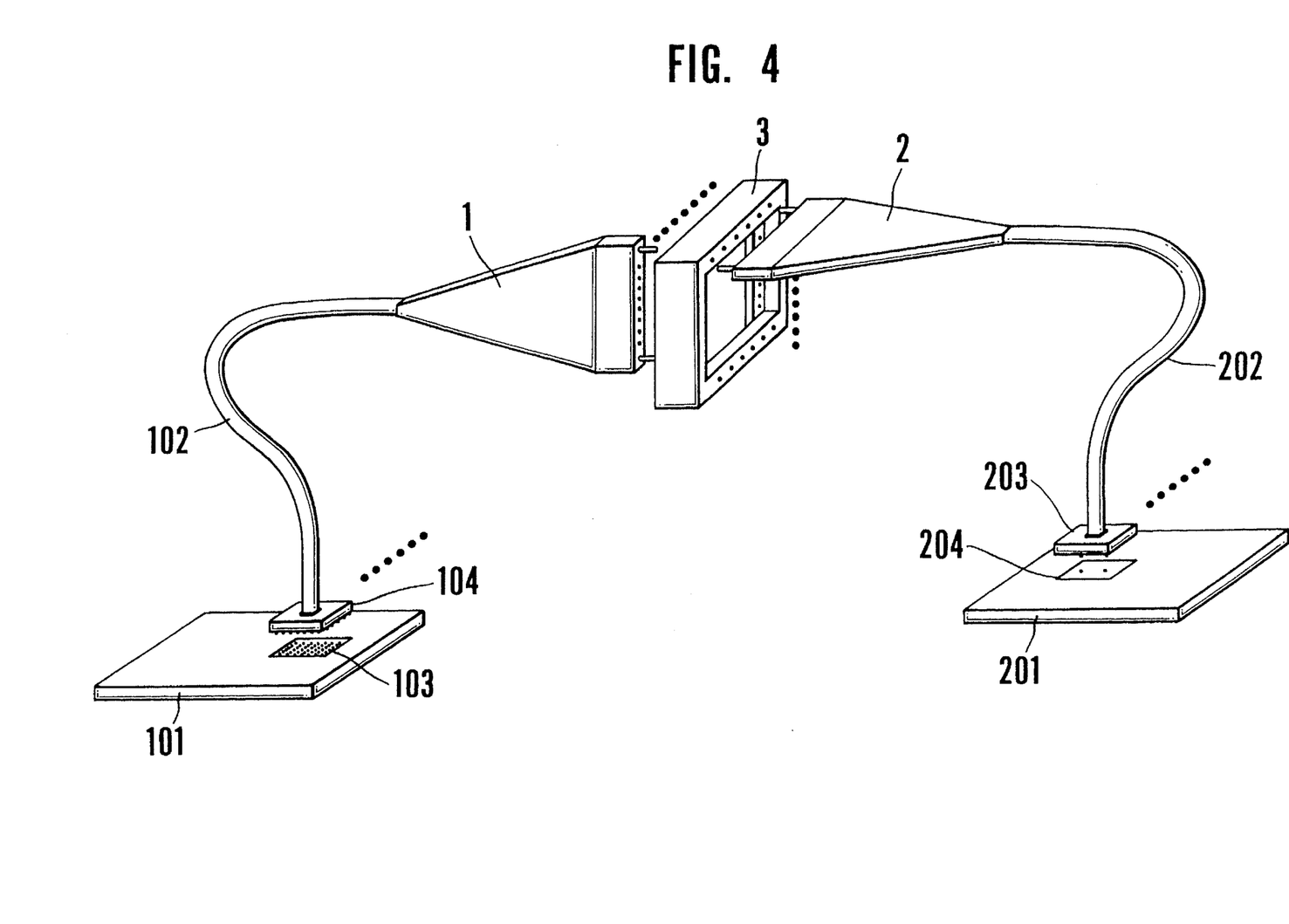
FIG. 4 shows the concept of a board-to-board signal transmission apparatus employing the first embodiment of the present invention.

FIG. 3 shows the outer appearance of an optical cross-coupling apparatus according to the first embodiment of the present invention. For example, this apparatus is an example of a space-division optical switch as shown in FIG. 4, which connects optical fiber bundles 102 connected to a plurality of transmission boards 101 and optical fiber bundles 202 connected to a plurality of reception boards 201 crosswise. A first connector 1 is connected to the transmission optical fiber bundle 102, and a second connector 2 is connected to the reception optical fiber bundle 202. The first and second connectors 1 and 2 are connected to each other crosswise through a socket 3. In this embodiment, note that 64 first connectors 1 and 64 second connectors 2 are provided.

Each first connector 1 forms a rectangularly parallelepipedic thin plate, and a plurality of optical fiber holes 11 are arranged and formed at a predetermined pitch in the longitudinal direction of the first connector 1 to extend through the connector in the direction T of thickness. Sixty-four optical fibers 102a constituting the optical fiber bundle 102 are aligned in a one-dimensional array to correspond to the optical fiber holes 11, and the respective optical fibers 102a are inserted and fixed in the optical fiber holes 11. In this case, the end faces of the respective optical fibers 102a are optically abraded such that they are flat on a plane corresponding to the distal end-side end face 1a of the connector 1. A width W of the connector is equal to or smaller than the pitch of the optical fibers 102a. A pair of guide pins 12 are provided at the two end portions, in the longitudinal direction, of the distal end face 1a of the connector 1 to interpose the optical fiber holes 11. The second connector 2 has an arrangement identical to that of the first connector 1. The second connector 2 has optical fiber holes 21 and guide pins 22. Optical fibers 202a of the optical fiber bundle 202 of the reception board 201 are connected to the second connector 2.

The socket 3 has a square frame portion 31 having an inner size equal to the length of the connector 1 or 2. Vertically extending thick-walled portions 32 are provided on the inner surfaces of vertical walls 31a of the frame portion 31 to project inward, and horizontally extending thick-walled portions 33 are provided on the inner surfaces of horizontal walls 31b of the frame portion 31 to project inward. In this case, the vertical thick-walled portions 32 are formed along the edge portions of the socket 3 that oppose the transmission connector (first connector 1), and the horizontal thick-walled portions 33 are formed along the edge portions of the socket 3 that oppose the reception connector (second connector 2). The inner surfaces of the thick-walled portions 32 and 33 are located on the same vertical plane. A plurality of guide pin holes 34 are formed in the respective thick-walled portions 32 and 33. The guide pins 12 and 22 provided to the connectors 1 and 2 can be inserted in the guide pin holes 34. The guide pin holes 34 are arranged at a pitch equal to that of the optical fibers 102a of the connector 1 and that of the optical fibers 202a of the connector 2.

Figure 5:
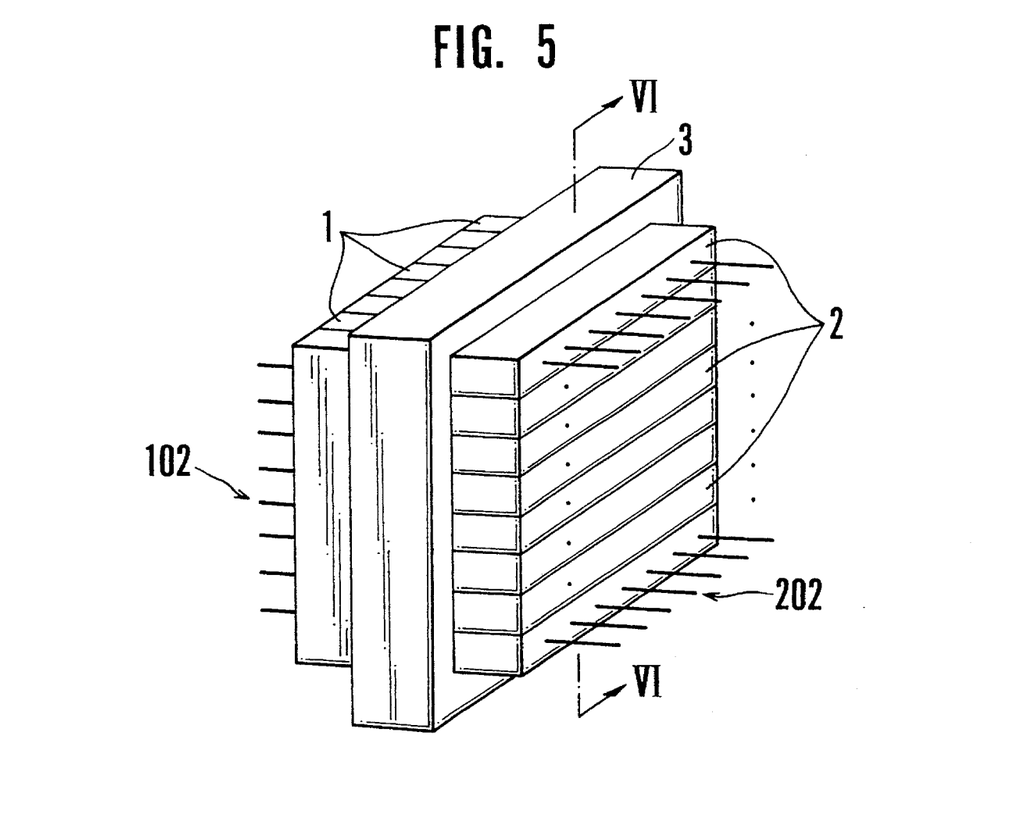
FIG. 5 is a perspective view of the assembled state of the first embodiment of the present invention.
Figure 6:
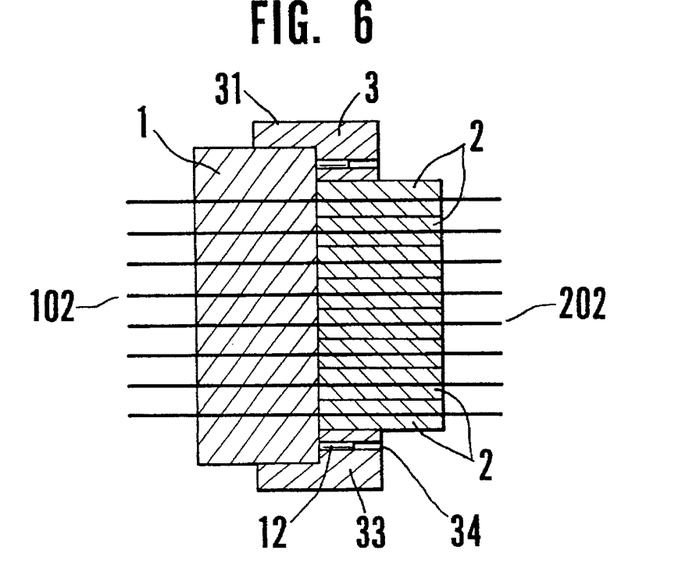
FIG. 6 is a sectional view taken along the line VI—VI of FIG. 5.

With this arrangement, as shown in the outer appearance view of FIG. 5 and the VI—VI sectional view of FIG. 6, the first connector 1 connected to the optical fiber bundle 102 of the transmission board is fitted in the socket 3 to be parallel to a vertical plane, and the guide pins 12 of the first connector 1 are fitted in the guide pin holes 34 of the horizontal thick-walled portions 33. Similarly, the remaining ones of the plurality of first connectors 1 are aligned in the vertical direction, and their guide pins 12 are fitted in the corresponding guide pin holes 34. As a result, the plurality of first connectors 1 are coupled to the socket 3 as they are aligned horizontally.

The second connector 2 connected to the optical fiber bundle 202 of the reception board is fitted in the socket 3 to be parallel to a horizontal plane, and the guide pins 22 of the second connector 2 are fitted in the guide pin holes 34 of the vertical thick-walled portions 32. Similarly, the remaining ones of the plurality of second connectors 2 are aligned in the horizontal direction, and their guide pins 22 are fitted in the corresponding guide pin holes 34. As a result, the plurality of second connectors 2 are coupled to the socket 3 as they are aligned vertically. In this state, the distal end faces 1a and 2a of the first and second connectors 1 and 2 are in contact with the end faces of the thick-walled portions 32 and 33. As the end faces of the thick-walled portions 32 and 33 are located on the same vertical plane, the distal end faces 1a and 2a of the connectors 1 and 2 coupled to the socket 3 are located on the same vertical plane. Accordingly, the distal end faces of the first connectors 1 are in contact with the distal end faces of the second connectors 2.

Therefore, the end faces of the opposite optical fibers 102a and 202a fixed to the connectors 1 and 2, respectively, are in contact with each other, so that they form a plurality of one-dimensional arrays in the vertical and horizontal directions. As a result, the optical fibers 102a and 202a of the first and second connectors 1 and 2 that are arranged in a matrix in the vertical and horizontal directions are connected to each other crosswise in the vertical and horizontal directions, thereby realizing optical cross coupling.

In this arrangement, a conventional cross-coupling portion in which optical fibers are arranged crosswise is not necessary, and the socket 3 only need be formed into a frame and the plurality of guide pin holes 34 only need be formed in the thick-walled portions 32 and 33 of the socket 3, leading to a very simple arrangement. Such a socket 3 can be manufactured easily. As a result, a low-cost optical cross-coupling apparatus suitable for mass production can be provided.

In this embodiment, multi-mode fibers each having a core diameter of 50 microns and an outer diameter of 125 microns are used as the optical fibers, and accordingly the optical fiber holes 11 and 21 have a diameter of 126 microns and a pitch of 1 mm. The outer diameter of the guide pins and the inner diameter of the guide pin holes are 0.5 mm, the pitch of the guide pins and the guide pin holes is 1 mm, and the length of the guide pins and the guide pin holes is 2 mm. The dimensional precision of these sizes is 10 microns in accordance with the core diameter of the optical fibers. If single-mode fibers having a core diameter of 10 microns are employed as the optical fibers, a dimensional precision of 2 microns or less is required.

Figure 7:
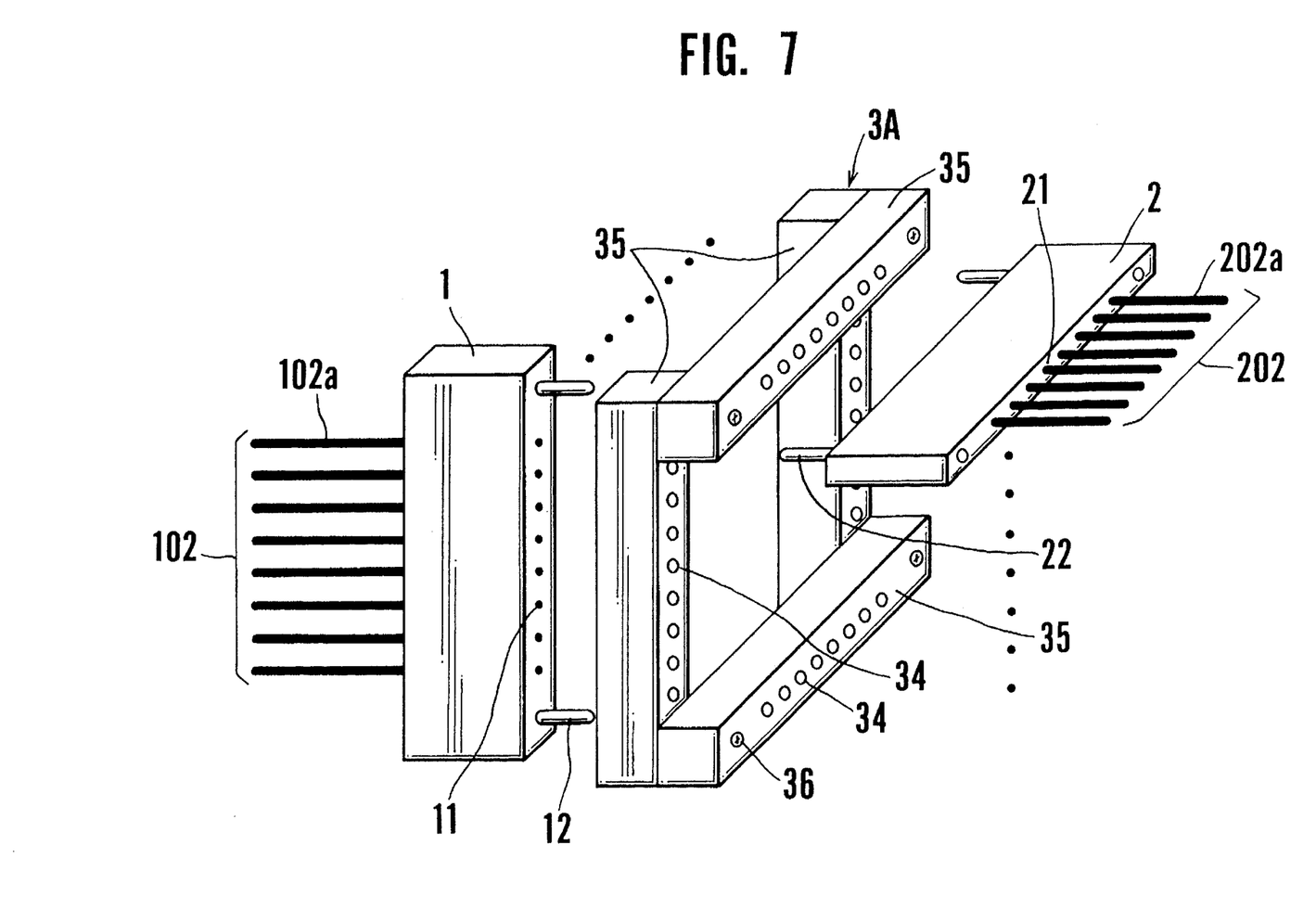
FIG. 7 is a partially exploded perspective view of the second embodiment of the present invention.

FIG. 7 shows the outer appearance of an optical cross-coupling apparatus according to the second embodiment of the present invention. In this embodiment, a socket 3A is formed with four components having the same shape. More specifically, four prisms 35, each having 64 guide pin holes 34 with an inner diameter of 0.5 mm formed in one array at a predetermined pitch in the longitudinal direction of the prisms 35, are prepared in advance, and these prisms 35 are assembled in parallel crosses. The intersecting portions of the prisms 35 are coupled to each other with bolts 36. In this case, the end faces of the guide pin holes 34 of the respective prisms 35 are formed flat so that they are located on the same plane. The gap between the vertically opposing prisms 35 and the gap between the horizontally opposing prisms 35 are set such that the gap between the guide pin holes 34 of the opposing prisms 35 is equal to the gap between the guide pins 12 or 22 provided on the two sides of the connector 1 or 2.

Therefore, when the guide pins 12 of the first connectors 1 arranged to be parallel to the vertical plane are inserted in the guide pin holes 34 of the prisms 35 assembled to be parallel to the horizontal plane, and the guide pins 22 of the second connectors 2 arranged to be parallel to the horizontal plane are inserted in the guide pin holes 34 of the prism 35 assembled to be parallel to the vertical plane, the opposing surfaces of the connectors 1 and 2 are located on the same vertical plane corresponding to the surfaces of the prisms. Thus, the surfaces of the connectors 1 are brought into tight contact with those of the connectors 2. As a result, optical fibers 102a and 202a connected to the respective connectors 1 and 2 can be connected to each other crosswise.

In this embodiment, the socket 3A is formed with the four prisms 35, and the prisms 35 can be assembled only by using screw members and pin members. Therefore, the arrangement of the second embodiment is more simplified than that of the first embodiment, providing advantages in terms of mass production and cost.

Figure 8:
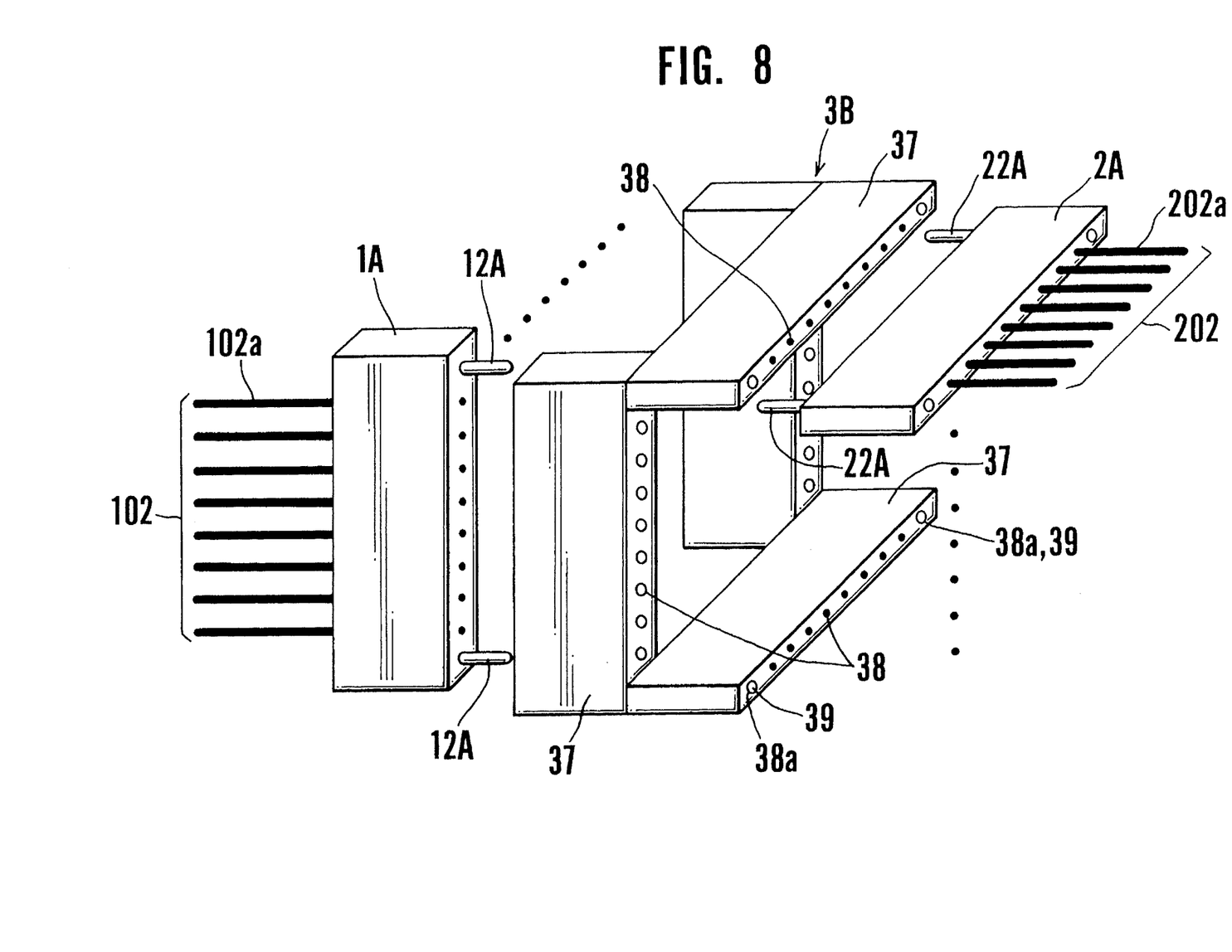
FIG. 8 is a partially exploded perspective view of the third embodiment of the present invention.
Figure 9:
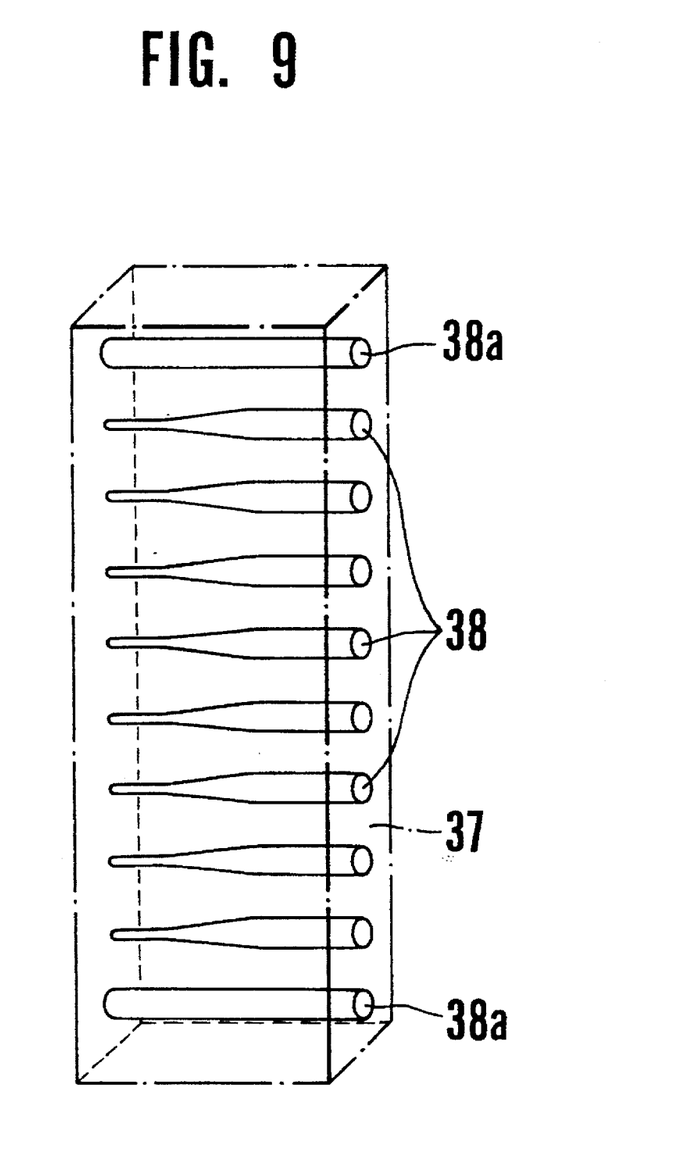
FIG. 9 is a perspective view of a component that constitutes a socket.

FIG. 8 shows the outer appearance of an optical cross-coupling apparatus according to the third embodiment which is an improvement over the second embodiment, and FIG. 9 shows the outer appearance of a component employed in the third embodiment. In the third embodiment, the components of a socket 3B having the same arrangement as that of the optical cross-coupling apparatus of the second embodiment have common structures between connectors 1 and 2, so that the components are made in common. More specifically, 66 through holes 38 are formed in a 0.9 mm×5 mm×66 mm prism 37 at a pitch of 1 mm, as shown in FIG. 9. Of these through holes 38, two through holes 38a located at the two ends are uniform holes having an inner diameter of 0.5 mm. The through holes 38 other than these two through holes 38a are asymmetric holes each having one end portion with an inner diameter of 0.5 mm and a length of 2 mm and the other end portion with an inner diameter of 125 μm and a length of 1 mm. A tapered portion with a length of 2 mm is formed at the intermediate portion of each asymmetric hole.

When this prism 37 is employed in each of the first and second connectors 1A and 2A, optical fibers 102a and 202a are inserted in the through holes 38 of the connectors 1A and 2A from the sides with the inner diameter of 0.5 mm and aligned in the holes with the inner diameter of 125 μm, and their end faces are optically abraded. Guide pins 12A are inserted in the through holes 38a at the two ends and are fixed such that they partly project from the through holes 38a. Thus, connectors having an arrangement substantially the same as that of the first and second connectors of the first and second embodiments can be formed.

When the prisms 37 are employed as a socket, four prisms 37 are assembled in parallel crosses by inserting coupling pins 39 with an outer diameter of 0.5 mm in the through holes 38a at the two ends of each prism 37. At this time, the vertical and horizontal prisms 37 are set such that the end portions of their through holes 38 with the inner diameter of 0.5 mm are directed to the sides opposing the connectors 1A and 2A.

When the connectors 1A and 2A are fitted in the socket having this arrangement by utilizing the guide pins 12A in the same manner as in the second embodiment (see FIG. 7), cross coupling of optical fibers can be realized completely in the same manner as in the second embodiment. In the third embodiment, since the socket and the connectors are made of common components, the number of components is decreased, and the cost of the die required when manufacturing these components by resin molding can be decreased.

In the above embodiments, 64 optical fibers are arranged in each connector. However, the number of optical fibers can be set arbitrarily. The present invention can also be applied to a case wherein all the optical fibers are not cross-connected to each other but, for example, every other optical fibers are cross-connected to each other.

What is claimed is:

1. An optical cross-coupling apparatus comprising a plurality of first connector groups in each of which a plurality of optical fibers are aligned in a one-dimensional array, a like number of second connector groups in each of which a plurality of optical fibers are aligned in a one-dimensional array, and a socket in which said first and second connector groups are aligned to oppose each other crosswise and mounted such that distal end faces of respective connectors of said two connector groups oppose and are in contact with each other on one plane, wherein guide pins are provided at two end portions, in a longitudinal direction, of opposing surfaces of said connectors, and said socket is formed into a rectangular frame by assembling four prismic components having the same shape in parallel crosses, and a plurality of guide pin holes in which said guide pins are to be inserted are formed in said frame portion in one array in both vertical and horizontal directions.

2. An apparatus according to claim 1, wherein each of said four prismic components constituting said socket has through holes larger in number than optical fibers to be mounted therein by tow, said four prismic components are assembled in parallel crosses with set members inserted in two through holes at two ends thereof, and each of the through holes excluding the two through holes at said two ends of each prismatic component has one end side with an inner diameter equal to an outer diameter of said guide pins and the other end side with an inner diameter equal to an outer diameter of said optical fibers.

3. An apparatus according to claim 2, wherein when said guide pins are set in the two through holes at said two ends of each of said prismic components and said optical fibers are fixed in the remaining through holes of each of said prismic components, said prismic components are employed as said first and second connectors.

* * * * *